(12) United States Patent
Horii

(10) Patent No.: US 10,970,311 B2
(45) Date of Patent: Apr. 6, 2021

(54) SCALABLE SNAPSHOT ISOLATION ON NON-TRANSACTIONAL NOSQL

(71) Applicant: INTERNATIONAL BUSINESS MACHINES CORPORATION, Armonk, NY (US)

(72) Inventor: Hiroshi H. Horii, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 14/960,913

(22) Filed: Dec. 7, 2015

(65) Prior Publication Data
US 2017/0161352 A1 Jun. 8, 2017

(51) Int. Cl.
G06F 16/28 (2019.01)

(52) U.S. Cl.
CPC ............ *G06F 16/283* (2019.01); *G06F 16/28* (2019.01)

(58) Field of Classification Search
CPC ......... G06F 17/30592; G06F 17/30587; G06F 16/283
USPC ....................................................... 707/607
See application file for complete search history.

(56) References Cited

U.S. PATENT DOCUMENTS

| | | | | |
|---|---|---|---|---|
| 5,535,386 A * | 7/1996 | Wang | | G06F 8/71 |
| 6,073,161 A * | 6/2000 | DeBoskey | | G06F 16/1767 |
| | | | | 709/200 |
| 6,980,998 B2 | 12/2005 | Kamen et al. | | |
| 6,990,503 B1 * | 1/2006 | Luo | | G06F 16/2343 |
| 8,468,132 B1 * | 6/2013 | O'Neill | | G06F 16/27 |
| | | | | 707/622 |
| 8,805,984 B2 * | 8/2014 | Markus | | G06F 9/466 |
| | | | | 709/223 |
| 8,965,861 B1 * | 2/2015 | Shalla | | G06F 9/466 |
| | | | | 707/703 |
| 9,100,330 B1 * | 8/2015 | Noveck | | G06F 13/385 |
| 9,141,930 B2 | 9/2015 | Suvernev et al. | | |
| 9,619,278 B2 * | 4/2017 | Vermeulen | | G06F 9/466 |
| 9,798,590 B2 | 10/2017 | Akkary et al. | | |
| 9,990,391 B1 * | 6/2018 | Cole | | G06F 16/2365 |
| 10,198,346 B1 * | 2/2019 | Cole | | G06F 11/3664 |

(Continued)

OTHER PUBLICATIONS

Peng, D. et al., "Large-scale Incremental Processing Using Distributed Transactions and Notifications" Proceedings of the 9th USENIX Symposium on Operating Systems Design and Implementation, USENIX (2010) pp. 1-14.

(Continued)

*Primary Examiner* — Mark E Hershley
(74) *Attorney, Agent, or Firm* — Tutuniian & Bitetto, P.C.; Randall Bluestone

(57) ABSTRACT

A method of a client processing transactions in a NoSQL database that includes inserting client status from a plurality of clients to a NoSQL database, and sending a call from at least one of the clients in the plurality of client to a client server in the NoSQL database, wherein the client server sends a time stamp to the client. The method further includes reading by the client the clients status from the NoSQL database, and the client validating no conflict for a read or write transaction by the client to the database. The client confirms that a latest version of a value is committed before a start time of the transaction. The client performs the read or write transaction if the latest version of the value has been committed.

20 Claims, 13 Drawing Sheets

(56) References Cited

U.S. PATENT DOCUMENTS

| | | | |
|---|---|---|---|
| 10,331,657 B1* | 6/2019 | Cole | G06F 16/901 |
| 10,346,434 B1* | 7/2019 | Morkel | G06F 16/21 |
| 2003/0236786 A1* | 12/2003 | Shi | G06F 16/2315 |
| 2007/0226196 A1* | 9/2007 | Adya | G06F 16/24539 |
| 2009/0171962 A1* | 7/2009 | Goodman | G06F 9/467 |
| 2009/0276537 A1* | 11/2009 | Deverick | H04L 63/061 |
| | | | 709/237 |
| 2010/0153945 A1* | 6/2010 | Bansal | G06F 9/4881 |
| | | | 718/1 |
| 2010/0185847 A1* | 7/2010 | Shasha | G06F 21/54 |
| | | | 713/150 |
| 2011/0302143 A1* | 12/2011 | Lomet | G06F 16/2322 |
| | | | 707/704 |
| 2012/0150802 A1* | 6/2012 | Popov | G06F 11/1487 |
| | | | 707/635 |
| 2012/0179877 A1* | 7/2012 | Shriraman | G06F 12/0815 |
| | | | 711/141 |
| 2013/0060742 A1* | 3/2013 | Chang | G06F 16/2336 |
| | | | 707/704 |
| 2013/0073473 A1* | 3/2013 | Heath | G06Q 30/06 |
| | | | 705/319 |
| 2013/0110883 A1* | 5/2013 | Junqueira | G06F 16/2336 |
| | | | 707/803 |
| 2013/0124475 A1* | 5/2013 | Hildenbrand | G06F 16/2315 |
| | | | 707/636 |
| 2014/0006464 A1* | 1/2014 | Pitts | G06F 12/0804 |
| | | | 707/827 |
| 2014/0330767 A1* | 11/2014 | Fowler | G06F 16/288 |
| | | | 707/607 |
| 2015/0074070 A1* | 3/2015 | Bortnikov | G06F 16/2308 |
| | | | 707/703 |
| 2015/0120687 A1* | 4/2015 | Bhattacharjee | G06F 16/2343 |
| | | | 707/704 |
| 2015/0172412 A1* | 6/2015 | Escriva | G06F 16/182 |
| | | | 709/202 |
| 2015/0193264 A1* | 7/2015 | Hutton | G06F 9/466 |
| | | | 719/328 |
| 2015/0277969 A1* | 10/2015 | Strauss | G06F 9/466 |
| | | | 707/703 |
| 2016/0048703 A1* | 2/2016 | Brandenburger | H04L 67/10 |
| | | | 726/26 |
| 2016/0050146 A1* | 2/2016 | Henderson | H04L 67/1097 |
| | | | 370/392 |
| 2016/0077901 A1* | 3/2016 | Roth | H04L 67/42 |
| | | | 719/328 |
| 2016/0086260 A1* | 3/2016 | Vermeulen | G06Q 40/00 |
| | | | 705/35 |
| 2016/0308882 A1* | 10/2016 | Bortnikov | G06F 9/466 |
| 2016/0378819 A1* | 12/2016 | Bishop | G06F 16/2379 |
| | | | 707/703 |
| 2017/0109394 A1* | 4/2017 | Chang | G06F 16/2336 |
| 2017/0308602 A1* | 10/2017 | Raghunathan | G06F 16/273 |

OTHER PUBLICATIONS

Gomez Ferro, D. et al., "Lock-free Transactional Support for Distributed Data Stores" 2014 IEEE 30th International Conference onData Engineering (ICDE) (Mar.-Apr. 2014) pp. 676-687.

U.S. Office Action issued related in U.S. Appl. No. 14/980,104, dated Mar. 21, 2018, pp. 1-18.

Notice of Allowance dated Apr. 18, 2019 for U.S. Appl. No. 14/980,104, 14 pages.

* cited by examiner

SCALABLE SNAPSHOT ISOLATION ON NON-TRANSACTIONAL NOSQL

BACKGROUND

Technical Field

The present disclosure relates generally to NoSQL database and, in particular, the processing of transactions in NoSQL environments.

Description of the Related Art

NoSQL (originally referring to "non SQL" or "non relational") database provides a mechanism for storage and retrieval of data that is modeled in means other than the tabular relations used in relational databases. Motivations for this approach include: simplicity of design, simpler "horizontal" scaling to clusters of machines, which is a problem for relational databases, and finer control over availability. The data structures used by NoSQL databases (e.g. key-value, graph, or document) differ slightly from those used by default in relational databases, making some operations faster in NoSQL and others faster in relational databases. NoSQL databases are increasingly used in big data and real-time web applications.

SUMMARY

According to an aspect of the present principles, a method is provided for processing transactions in NoSQL databases. In some embodiments, the method for a client processing transactions in the NoSQL database may include inserting client status from a plurality of clients to said NoSQL database, and sending a call from at least one of said clients in said plurality of client to a client server in said NoSQL database, wherein the client server sends a time stamp to said client. The client than reads the clients status from the NoSQL database, and validates no conflict for a write transaction. The client validates no conflict by the client to the database by confirming that a latest version of a value is committed before a start time of the transaction. The value may include a client ID, a transaction ID and data. The client performs a write transaction for if the latest version of the value has been committed.

According to another aspect of the present principles, a system is provided for processing transactions in NoSQL databases. In some embodiments, the system includes a client status update transceiver for sending client status from a client to a NoSQL database; and a time stamp transceiver for sending a call from said client to a client server (TS) in said NoSQL database, and receiving a time stamp from said client server. The system may further include a client status reader for reading by the client of all clients' status from all clients sending client status to the NoSQL database. In some embodiments, the system further includes a conflict validator for validating no conflict for a read or write transaction by said client to said NoSQL database, said conflict validator confirming that a latest version of a value is committed before a start time of the transaction. The value comprises a client ID, a transaction ID and data. The system may further include a read or write module for performing said read or write transaction by said client if said latest version of the value has been committed.

In accordance with another aspect of the present disclosure a non-transitory article of manufacture is provided that tangibly embodies a computer readable program. In one embodiment, a non-transitory computer readable storage medium is provided that includes a computer readable program for processing transactions in NoSQL databases. The computer readable program when executed on a computer causes the computer to perform the steps of inserting client status from a plurality of clients to the NoSQL database, and sending a call from at least one of the clients in the plurality of clients to a client server in the NoSQL database, wherein the client server sends a time stamp to the client. The client than reads the clients status from the NoSQL database, and validates no conflict for a write transaction. The client validates no conflict by the client to the database by confirming that a latest version of a value is committed before a start time of the transaction. The value may include a client ID, a transaction ID and data. The client performs a write transaction for if the latest version of the value has been committed.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
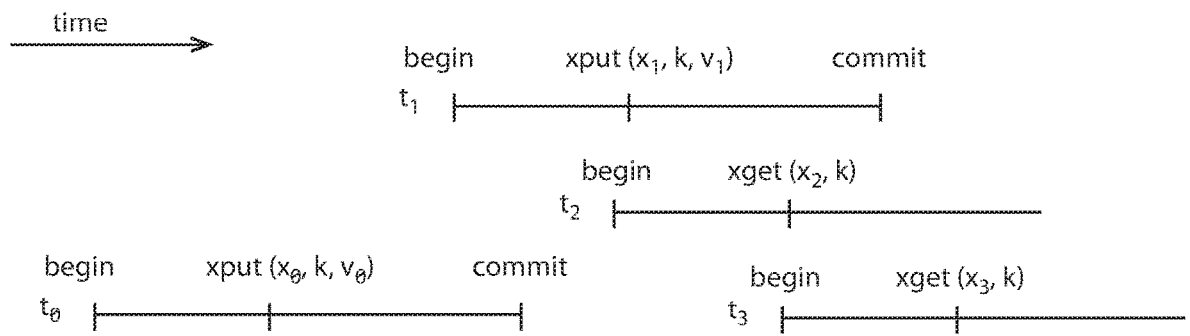
FIG. 1 is a schematic illustrating snapshot isolation for data access via transactional Application Protocal Interfaces (APIs) as used in a NoSQL database service, in accordance with one embodiment of the present disclosure.

The present principles are related to processing transactions in NoSQL databases. NoSQL, which encompasses a wide range of technologies and architectures, seeks to solve the scalability and big data performance issues that relational databases weren't designed to address. In accordance with some embodiments of the present disclosure, it can be assumed that multiple database servers provide a service of a NoSQL database.

A NoSQL database environment is a non-relational and largely distributed database system that enables rapid, ad-hoc organization and analysis of extremely high-volume, disparate data types. NoSQL databases are sometimes referred to as cloud databases, non-relational databases, Big Data databases and a myriad of other terms and were developed in response to the sheer volume of data being generated, stored and analyzed by modern users (user-generated data) and their applications (machine-generated data).

In general, NoSQL databases have become the first alternative to relational databases, with scalability, availability, and fault tolerance being key deciding factors. They go well beyond the more widely understood legacy, relational databases (such as Oracle, SQL Server and DB2 databases) in satisfying the needs of today's modern business applications. A very flexible and schema-less data model, horizontal scalability, distributed architectures, and the use of languages and interfaces that are "not only" SQL typically characterize this technology. Contrary to misconceptions caused by its name, NoSQL does not prohibit structured query language (SQL). While it's true that some NoSQL systems are entirely non-relational, others simply avoid selected relational functionality such as fixed table schemas and join operations. For example, instead of using tables, a NoSQL database might organize data into objects, key/value pairs or tuples.

There are four general types of NoSQL databases, each with their own specific attributes:

Graph database—Based on graph theory, these databases are designed for data whose relations are well represented as a graph and has elements which are interconnected, with an undetermined number of relations between them. Examples include: Neo4j and Titan.

Key-Value store—we start with this type of database because these are some of the least complex NoSQL options. These databases are designed for storing data in a schema-less way. In a key-value store, all of the data within consists of an indexed key and a value, hence the name. Examples of this type of database include: Cassandra, DyanmoDB, Azure Table Storage (ATS), Riak, BerkeleyDB.

Column store—(also known as wide-column stores) instead of storing data in rows, these databases are designed for storing data tables as sections of columns of data, rather than as rows of data. While this simple description sounds like the inverse of a standard database, wide-column stores offer very high performance and a highly scalable architecture. Examples include: HBase, BigTable and HyperTable.

Document database—expands on the basic idea of key-value stores where "documents" contain more complex in that they contain data and each document is assigned a unique key, which is used to retrieve the document. These are designed for storing, retrieving, and managing document-oriented information, also known as semi-structured data. Examples include: MongoDB and CouchDB.

Major NoSQLs do not support transactions. As used herein, a "transaction" comprises a set of data manipulation operations on the state of a database system managed as a single unit of work, so all the operations must either entirely be completed (committed) or have no effect (aborted). In other words, partial executions of the transaction are not defined (nor desired in general) because the final state of the database can be corrupted. Without the support for transactions, developers can be burdened with ensuring atomic execution of scattered changes in data upon failures as well as when there are concurrent accesses to the same data by multiple clients. In order to process transactions, conventional database systems provide a specific component called the Transaction Manager. The goal of transaction managers in general is to guarantee the so-called ACID properties of transactions: Atomicity, Consistency, Isolation and Durability. However, ACID properties are hard to scale when databases have to deal with very large amounts of data and thousands of concurrent users, because the data must be partitioned, distributed and replicated. That is one of the reasons why, with the advent of NoSQL big data stores, transactions were initially left out of the equation. HBase, Dynamo, BigTable, PNUTS, Cassandra, etc. lacked this precious feature initially. However, with the popularization of NoSQL big datastores in many areas of the industry, the need for transactions has become advantageous for certain applications. For example, as applications become larger and more complex, transactions are sometimes needed to maintain consistency of the application.

It has been determined that prior methods, e.g., optimistic currency control (OCC), for handling transactions are insufficient. For example, percolator stores dirty data and transaction states in NoSQL. Each client processes the validation phase of OCC for each store of dirty data (decentralized approach). Omid provides a centralized server that processes the validation phase of OCC. Each client stores dirty data in NoSQL and sends keys of modified values in a transaction to the server (centralized approach). However, these approaches require the system to process heavy overheads of transactions. For example, percolator clients send two write requests to NoSQL for each write in a transaction. The centralized server of Omid becomes the bottleneck in disturbed environments.

The methods, systems and computer program products disclosed herein provide a new solution to the aforementioned difficulties. In some embodiments, the methods, systems and computer program products of the present disclosure provide for processing of transactions by using only basic NoSQL operations. The NoSQL database service includes management of key value pairs of a map m by following Application Protocal Interfaces (APIs). More specifically, in one example, transaction processing is provided with only three methods of the NoSQL database for a map object m: m.get(k), which returns the latest version v of a value of a key k, m.prev(v), which returns the previous version of v, and m.put(k, $v_{prev}$, $v_{new}$), which adds a new version $v_{new}$ if the latest version of k is $v_{prev}$ and returns true if $v_{prev}$ is the latest; otherwise, returns false. In some embodiments, the methods, systems and computer program products that are disclosed herein may provide a method to process transactions by using only basic NoSQL operations, and may incorporate snapshot isolation support; one write request for each transactional write; and no validation in the centralized server. The NoSQL database service disclosed herein guarantees strong consistency for data access via the APIs. Based on a hash code of a key k, the NoSQL database stored all the versions of k's value.

The methods, systems and computer program products that are disclosed herein provide transactional data access via following APIs by using the NoSQL API's, which may include: begin ( ): starts a transaction and returns its transaction ID ($x_{id}$); xmap.xput ($x_{id}$, k, v): inserts a new version of k's value into a map xmap in the transaction of $x_{id}$; xmap.xget ($x_{id}$,k): gets the latest version of k's value from a map (xmap) in the transaction of $x_{id}$; commit ($x_{id}$): commits the transaction of ($x_{id}$); and rollback ($x_{id}$): rolls back the transaction of ($x_{id}$).

In some embodiments, the methods, systems and computer program products that are disclosed herein can provide snapshot isolation for data access via the transactional APIs described above, which is schematically depicted in FIG. 1. In some embodiments, because the methods, systems and computer program products can also enable other isolation levels, the snapshot isolation depicted in FIG. 1 may be optional. In databases, and transaction processing (transaction management), "snapshot isolation" is a guarantee that all reads made in a transaction will see a consistent snapshot of the database (in practice it reads the last committed values that existed at the time it started), and the transaction itself will successfully commit only if no updates it has made conflict with any concurrent updates made since that snapshot. Snapshot isolation reduces validation errors. In one embodiment, as depicted in FIG. 1, a transaction can read all the versions that have been committed when the transaction started. For example, $x_1$ and $x_2$ read $v_o$ and $x_3$ can read $v_1$. As will be shown below, with snapshot isolation, when a client starts a transaction with a start time stamp ($t_{start}$), the client reads all the committed values at the start time stamp ($t_{start}$). With a first-committer (Updater)-Win, when two concurrent transactions attempt to write the same value, only one of them can commit the transaction. With a multi-version concurrency control (MVCC), one value had multiple versions, and each client can read any of the versions. For read-write transactions with the methods, systems and computer program products of the present disclosure, the clients gets a start timestamp ($t_{start}$) when a transaction begins; and the client reads a version of the value, which is the latest at the start timestamp ($t_{start}$). The client sends the start timestamp ($t_{start}$), and a write set to the database server. The database server clocks a commit timestamp ($t_{commit}$), and validates no overlaps between the write set and writes between the commit timestamp ($t_{commit}$) and the start timestamp ($t_{start}$).

Figure 2:
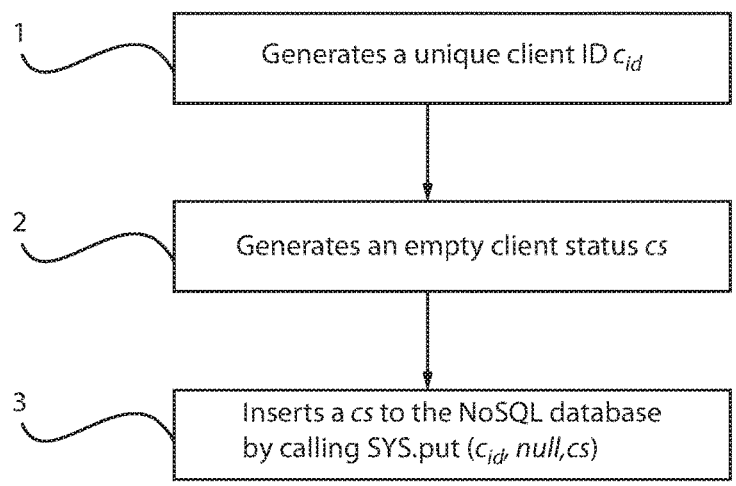
FIG. 2 is a flow/block diagram illustrating initialization steps of a client, in accordance with one embodiment of the present disclosure.

FIG. 2 is a flow/block diagram illustrating initialization steps of a client. When a client starts, an unique client ID is generated ($c_{id}$) at step 1, a empty client status cs is generated at step 2, and then the cs is inserted to a special map SYS in the NoSQL database with SYS.put($c_{id}$, null, cs) at step 3.

Initialization of the database servers may include selecting one server to provide time stamps to all the clients. In this example, a client defines a map SYS, a client puts θ as a value of a special key TS by calling SYS.put (TS, null, θ). The NoSQL database selects one server to store the value based on the key θ. When a client gets a new timestamp, the client calls: 1. current=SYS.get (TS); and/or 2. SYS.put (TS, current, (current+1)). In some embodiments, when the put returns false, the process restarts from 1. In some embodiments, when the put returns true, the method uses current+1, as the new times stamp.

Referring back to FIG. 2, during initialization of the client, at step 1, when the client starts, the client generates a unique client ID $c_{id}$. In one example, this may be referred to as getting a new time stamp. At step 2, the method may continue with inserting an empty client status cs as $c_{id}$'s value in SYS. In some embodiments, the put call must not fail because $c_{id}$ is unique. In some embodiments, this client status is used to manage all the transactions that the client of $c_{id}$ executes. As illustrated in FIG. 2, the method continues at step 3 with inserting a client status cs to the NoSQL database by calling SYS.put ($c_{id}$, null, cs).

The NoSQL database locates key-value pairs on the database server based on the keys. Because one database server manages one pair of key and value, multiple servers may manage client IDs, as described in FIG. 3. Each client stores a client status that manages transactions of the client. Each client can cache all of the client statuses and processes validation in the optimistic concurrently control (OCC). When multiple clients run, their client statuses and the timestamps can be located in different servers.

Figure 3:
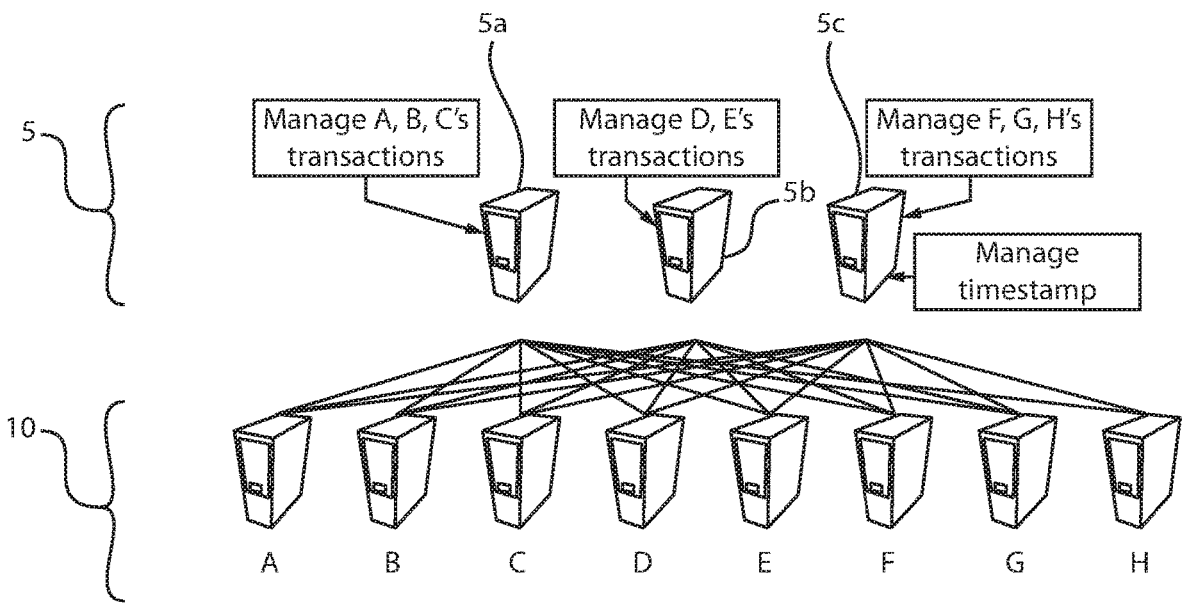
FIG. 3 is a schematic illustrating mapping between database servers and application servers (clients), in accordance with one embodiment of the present disclosure.

FIG. 3 is a schematic illustrating mapping between database servers 5 and application servers (clients) 10, in which multiple NoSQL database servers manage transactions, in accordance with one embodiment of the present disclosure. For example, databases server 5a can manage the transactions for application servers (clients) 10a, 10b, 10c; database server 5b can manage the transactions for application servers (clients) 10d, 10e; and database server 5c can manage the transactions for application servers (clients) 10f, 10g, 10h. Database server 5c may also manage time stamping. Timestamp is the current time of an event that is recorded by a computer. The database server identified by reference number 5c may also be referred to a centralized time stamp server (TS).

The system can use sequential numbers as timestamps. In other word, the TS server can return sequential numbers as timestamps. For example, if a special map SYS is defined and TS is a constant value, and then clients can get a timestamp by (1) acquiring the current clock current by calling SYS.get(TS), and (2) updating the value with SYS.put(TS, current, current+1). If a call of put is successful, the value (current+1) is the current timestamp. If a NoSQL database executes (1) and (2) with a single API call (such as ($inc operator of MongoDB), the API call can be used for time stamping.

In some embodiments, a client, i.e., application server 10, stores a client status in the NoSQL database. The client status may include mappings from transaction IDs of committed transactions to their commit time (e.g., $x_{id} \rightarrow t_{commit}$), and transaction IDs of aborted transactions and constraints to commit active transactions. A constraint in a client status is an order constraint, e.g., mapping of the transaction ID ($x_{id}$) with a constraint time $t_{constraint}$, e.g., $X_{id} \rightarrow t_{constraint}$. In some embodiments, the transaction IDs of committed and aborted client statuses must be disjointed. Further, the commit time $t_{commit}$ in committed must be greater than the constraint time $t_{constraint}$ in constraint.

In some embodiments, the methods, systems and computer program products disclosed herein operate under the assumption that each client 10a, 10b, 10c, 10d, 10e, 10f, 10g, 10h continuously requests multiple transactions. In some embodiments, the idea is that each version of a value includes IDs of a client ($c_{id}$) and a transaction ID ($x_{id}$) that generated and committed the version. In other word, when a client calls m.put(k, $v_{prev}$, $v_{new}$), the $v_{new}$, includes $c_{id}$ and $x_{id}$. The NoSQL, i.e., database servers 5a, 5b, 5c, stores a client status for each client to manage committed and aborted transactions.

In some embodiments, the methods, systems and computer program products select one server TS server from database servers 5a, 5b, 5c of a NoSQL. The selected server TS from the database serves manages timestamps, i.e., manages the start time $t_{start}$, and the commit time $t_{commit}$. Each version of a record includes the ID of the client ($c_{id}$), th ID of the transaction ($x_{id}$), and row data. In the context of a relational database, a row—also called a record or tuple—represents a single, implicitly structured data item in a table.

Each client 10a, 10b, 10c, 10d, 10e, 10f, 10g, 10h stores a client status (cs) in the NoSQL database 5a, 5b, 5c. The client status (cs) that is stored by the NoSQL database 5a, 5b, 5c include committed client status, e.g., committed transactions mapping a transaction ID to a commit time $t_{commit}$, and aborted client status, e.g., aborted transactions. The Client Status (cs) that is stored by the NoSQL database 5a, 5b, 5c may optionally include a constraint client states, which includes the order constraint, e.g., mapping of the transaction ID ($x_{id}$) with a start time Ts. Each client 10a, 10b, 10c, 10d, 10e caches client statuses in the NoSQL database 5a, 5b, 5c. In some embodiments, the database servers, i.e., the NoSQL database 5a, 5b, 5c, are Desktop as a Service (DaaS), ex. Cloudera and MongoDB. In some embodiments, the clients can be provided as application servers is Infrastructure as a Service (IaaS), e.g., Softlayer and AWS, and platform as a service (PaaS), e.g., Bluemix and Heroku. In some embodiments, there is no interaction between the servers, and there is not transactional operation for the multi-writes at the clients. There may be dynamic routing based on the workload between the clients and the servers.

In some embodiments, each client validates no conflict for each write to confirm the latest version is committed before the start time ($t_{start}$) by using the cached client status of the value's client ID ($c_{id}$). In some examples, the client validates that no conflict exists may include a first step (1) of fetching the latest version of a value, a second step (2) of identifying a cache of a client status with the value's client ID ($c_{id}$), and a third step (3) of checking the value's transaction ID ($x_{id}$) in the client status. If it is not committed yet, the client validates process may continue at step (4) with updating the cache and continuing the processes at step (3) again. In some examples, if the latest version is not committed, the client fails the client's transaction, aborts the transaction of the value's transaction ($x_{id}$), or adds an order constraint to the status, and reads the previous version.

Figure 4:
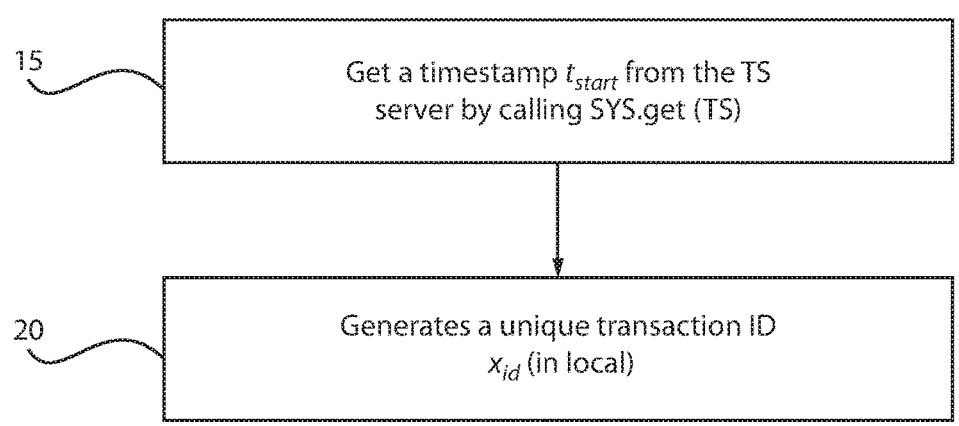
FIG. 4 is a flow/block diagram illustrating one embodiment of a method of beginning a transaction in a NoSQL database service, in accordance with one embodiment of the present disclosure.

FIG. 4 is a flow/block diagram illustrating one embodiment of a method of beginning a transaction, in accordance with one embodiment of the present disclosure. In some embodiments, starting a transaction $x_{id}$ in a client (c1) may begin at step 15 by getting a timestamp ($t_{start}$) from the centralized time stamp server (TS) by calling SYS.get(TS). At step 20, the client (c1) generates a unique transaction ID ($x_{id}$)(in local).

Figure 5:
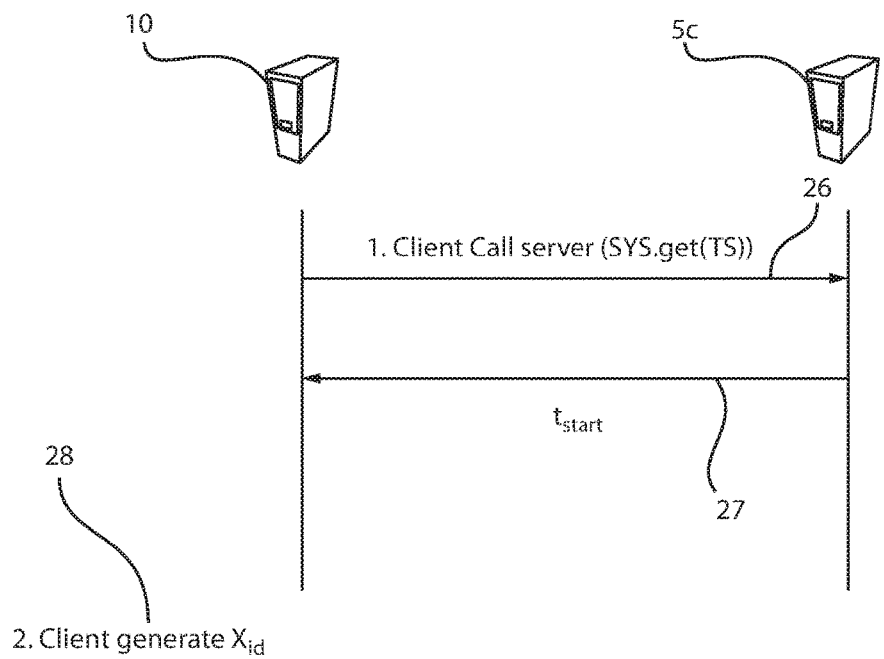
FIG. 5 is a schematic that illustrates one embodiment of beginning a transaction in NoSQL databases, in accordance with one embodiment of the present disclosure.

Referring to FIG. 5, in some embodiments, generating the transaction ID ($x_{id}$) may begin with a client, e.g., client 10 as depicted in FIG. 3, making a call to the centralized server, e.g., NoSQL database server 5c that has been selected for time stamp (TS) management. This call is depicted by step 1, which is identified by reference number 26 in FIG. 5. In response to the call from the client 10, the centralized server, e.g., NoSQL database server 5c, generates a time stamp ($t_{start}$), which is identified by reference number 27 in FIG. 5. The client 10 may then generate a transaction ID ($x_{id}$), as identified by reference number 28 in FIG. 5.

Figure 6:
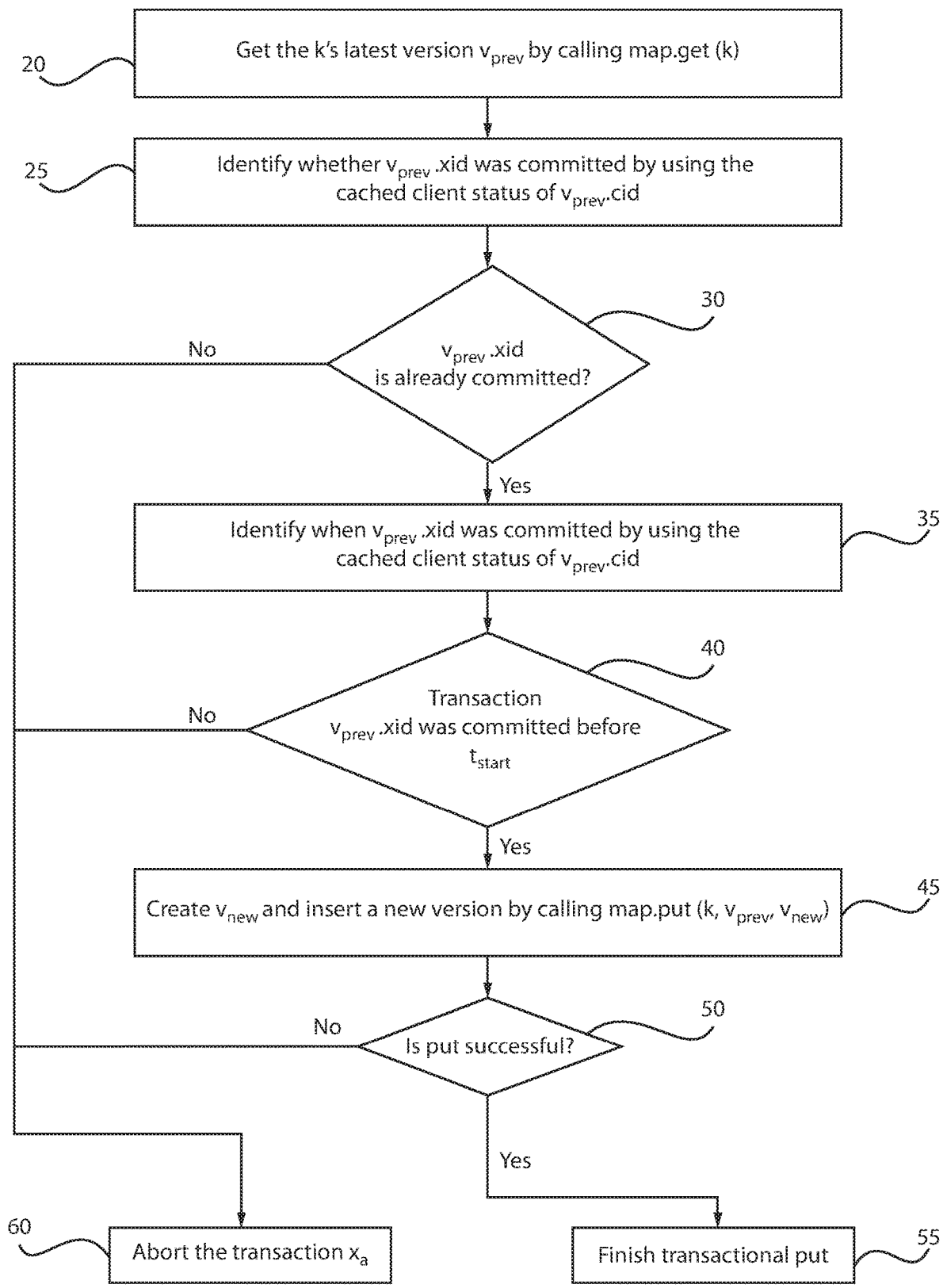
FIG. 6 is a flow/block diagram illustrating one embodiment of write transaction in NoSQL databases, in accordance with one embodiment of the present disclosure.

FIG. 6 illustrates one embodiment of a process flow for a write operation (xput) in a transaction in NoSQL databases in accordance with the present disclosure. Options in xput processing can include that the client can update the cache of the client status of $v_{prev}$. cid by calling SYS.get($c_{id}$). The client can also abort the transaction of $v_{prev}$.xid and delete the version $v_{prev}$ from the k's value in the NoSQL database.

Figure 8:
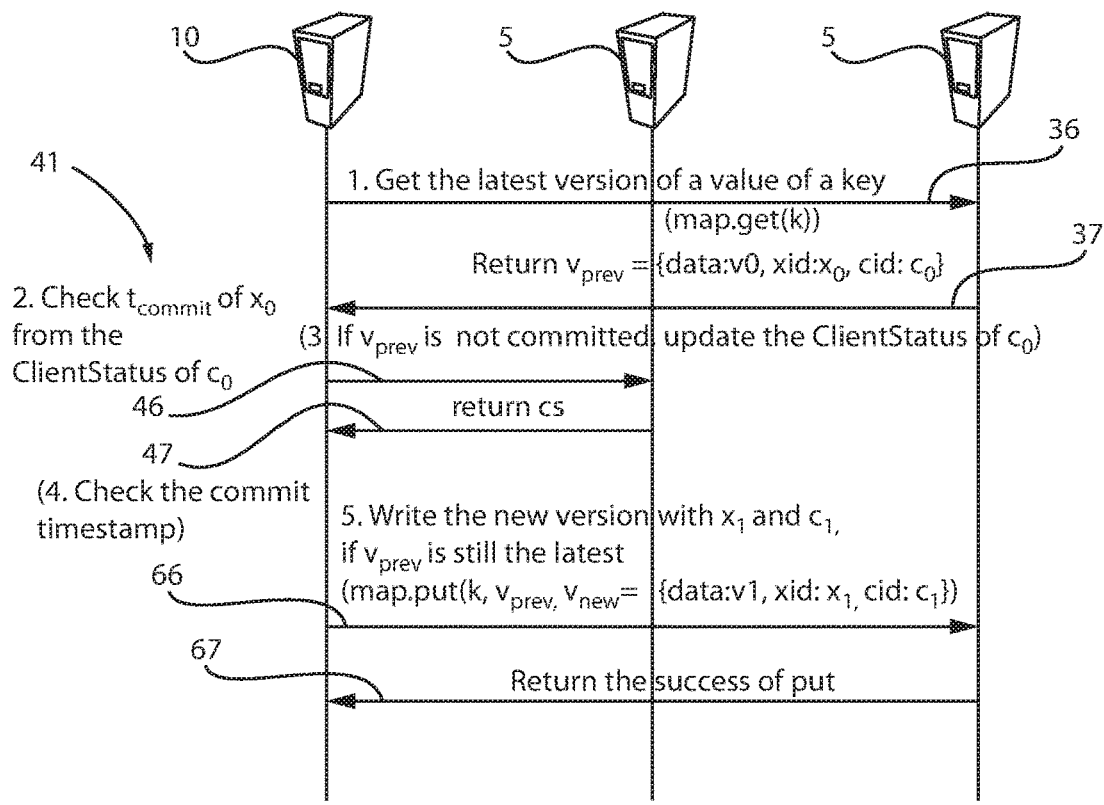
FIG. 8 is a schematic that illustrates one embodiment of a write operation in NoSQL databases with a cache update, in accordance with the present disclosure.

Referring to FIG. 6, the method disclosed herein may employ only one write request for each transactional write. Each client may validate no conflict for each write, which is similar to Percolator, in order to confirm the latest version is committed before the start time ($t_{start}$) by using the cached client status (cs) of the value's client ID. For example, the client may at step 20 fetch the latest version of a value ($v_{prev}$) by calling map.get(k). In a following step 25, the client can identify a cache of a client status (cs) with the $v_{prev}$'s client ID ($v_{prev}$.cid). For example, the client can identify whether $v_{prev}$.xid was committed by using the cached client status of $v_{prev}$.cid. At step 30, the client can check the value's transaction ID ($v_{prev}$.xid) in the client status (cs). For example, the client can check whether $v_{prev}$.xid is already committed. If $v_{prev}$.xid has not been committed, the transaction is aborted at step 60. Assuming that $v_{prev}$.xid has been committed, the method may continue at step 35, which includes the client identifying whether the commit timestamp with the transaction ID of the fetched value ($v_{prev}$.xid) was committed by using the cached client status of $v_{prev}$.xid. In a following step, the client can compare the $t_{commit}$ of $v_{prev}$.xid and $t_{start}$ of the transaction at step 40. If the latest version is not committed or committed after $t_{start}$ of the transaction at steps 30 and 40, the client fails the client's transaction, aborts the transaction of the value's $x_{id}$ ($v_{prev}$.xid), or adds an order constraint to the status and read the previous version. If at step 35, the client cannot identify whether $v_{prev}$ is committed with the cached client status, the client can update the cache (as depicted in FIG. 8), e.g., update the NoSQL database with client status (cs) by calling cs.get($v_{prev}$.cid) and begins the processes again at step 25.

Finally, at step 45, the client generates a new version of the value $v_{new}$ by setting $v_{new}$.cid, $v_{new}$.xid and $v_{new}$.data as the client ID and transaction ID of the transaction and the value that the transaction is writing, and the client inserts $v_{new}$ as the next version of $v_{prev}$. At step 50 if the put is successful, the write operation (xput) is finished at step 55. At step 50 if the put is not successful the transaction is aborted at step 60. This method fails if the other client updates $v_{prev}$ before the call. When the call fails, the transaction is aborted.

Figure 7:
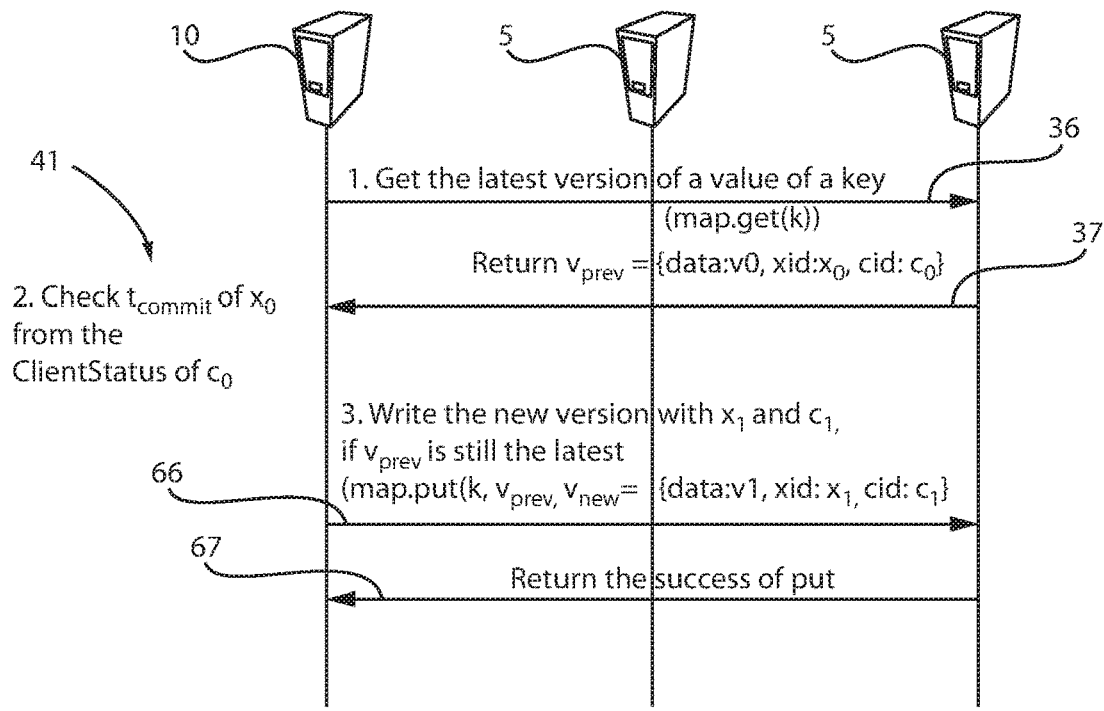
FIG. 7 is a schematic that illustrates one embodiment of a write operation in NoSQL databases, in accordance with the present disclosure.

Referring to FIGS. 6 and 7, the write operation (xput) may include the client fetching a latest version $v_{prev}$ of a value at step 20. FIG. 7 illustrates a xput function of a client $c_1$ with a new value v1 in a transaction $x_1$. A database shard is a horizontal partition of data in a database.

The value $v_{prev}$ may include data, e.g., row data, a transaction ID ($x_0$), and a client ID ($c_0$). The client 10 may fetch the value from a database server 5 of the NoSQL databases, as depicted by FIG. 7. This step is illustrated in FIG. 6 as step 1. More specifically, the client 10 sends a request, as identified by reference number 36, for the latest version of a value to the database server, e.g., NoSQL databases 5. Still at step 1, the database server 5, e.g., NoSQL databases, returns a version ($v_{prev}$) of the value to the client that made the request. This is illustrated by the arrow identified by reference number 37 in FIG. 7. The version ($v_{prev}$) of the value may include data, a transaction ID ($x_0$) and a client ID ($c_0$).

Referring to step 25 of FIG. 6, the method may continue with the client identifying the client ($c_0$) and transaction ($x_0$) from the version ($v_{prev}$) of the value. This is illustrated at step 2 in FIG. 7. In some embodiments, the client 10 can check the commit time ($t_{commit}$) of the version ($v_{prev}$) of the value from the client status (cs) as identified at reference number 41.

At steps 30, 35 and 40 of FIG. 6, if the value is committed before the transaction started, the method continues to step 45. At step 45 of the method depicted in FIG. 6, the client 10 inserts a new version ($v_{new}$) of the value that follows the previous version ($v_{prev}$) of the value by using client access server (CAS) operation. $v_{new}$ consists of a transaction ID ($x_1$), client ID ($c_1$), and data. If the other version has already followed $v_{prev}$, then the client does not insert $v_{new}$ and rolls back the transaction of the client (write fail). The client typically adds the new version ($v_{new}$) if the fetched version is still the latest. This is depicted in FIG. 7 by step 3 of writing from the client to the database server (as identified by the arrow having reference number 66) the new version with the client ID ($c_1$) and the transaction ID ($x_1$), when the version ($v_{new}$) is the latest.

If the client cannot identify whether the version of the value is not committed with the cache of the client status, the client can update the cache and restart the write process. For example, if the transaction ID $x_0$ processed by the client $c_0$ for the version ($v_{prev}$) in FIG. 8 is not in the mapping of the committed transactions to commit timestamps of the client status of $c_0$, the client updates the cache of client status (cs). The client 10 may then check to determine whether the latest, i.e., updated, version of the value ($x_0$) is committed at step 35 of the method depicted in FIG. 6. For example, the client may check to determine $v_{prev}$.xid is committed with the cached client status of $v_{prev}$.cid, again. In some embodiments, this may include the client checking the commit timestamp ($t_c$), as illustrated by step 4 of FIG. 8.

If the version $v_{prev}$ of the value is not committed, the client can attempt to abort the transaction of $v_{prev}$.xid. If the client cannot abort it, the client can rolls back the transaction of the client (write failure) at step 60 of FIG. 6.

If when the client checks to determine whether the latest, i.e., updated, version of the value ($v_{prev}$.xid) is committed at step 40 of the method depicted in FIG. 6, and the value is committed, the method continues to step 45.

At step 45 of the method depicted in FIG. 6, the client 10 inserts a new version ($v_{new}$) of the value that follows the previous version ($v_{prev}$) of the value by using client access server (CAS) operation. $v_{new}$ consists of a transaction ID (xid), client ID (cid), and data. If the other version has already followed $v_{prev}$, then the client does not insert $v_{new}$ and rolls back the transaction of the client (write fail). The client typically adds the new version ($v_{new}$) if the fetched version is still the latest. This is depicted in FIG. 8 by step 5 of writing from the client to the database server (as identified by the arrow having reference number 66) the new version with the client ID ($c_1$) and the transaction ID ($x_1$), when the version ($v_{prev}$) is the latest.

FIG. 8 depicts a write operation with a cache update. The sequence of operations depicted in FIG. 8 are similar to the sequence of operations that are depicted in FIG. 7. FIG. 8 further includes step 3, which is identified by reference numbers 46 and 47, and includes the cache update after checking the $t_{commit}$ of $x_0$. The arrow identified by reference number 46 represents that when vprev is not committed, the client updates the client status of $c_0$. The arrow identified by reference number 47 is the returned client status cs.

Figure 9:
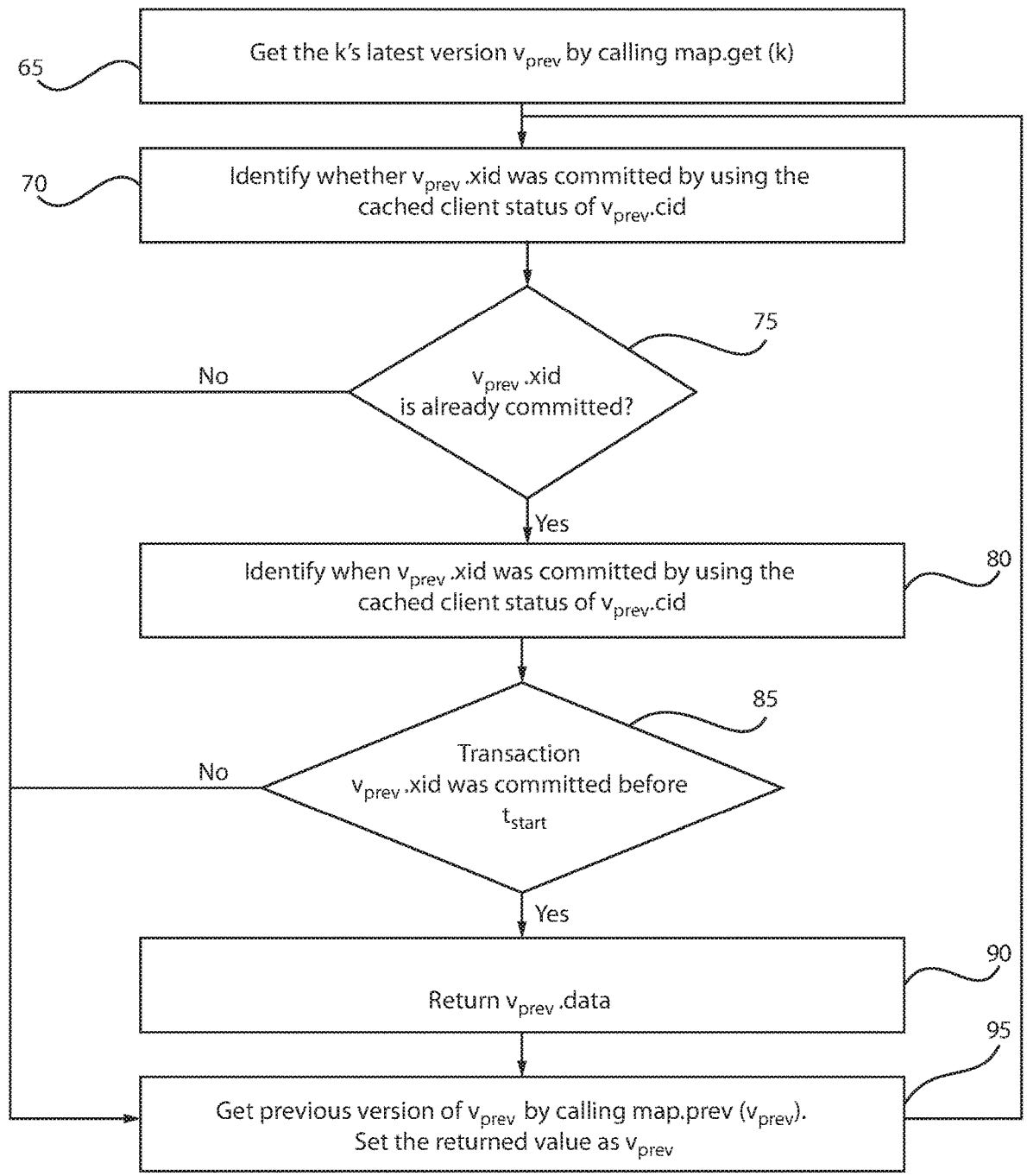
FIG. 9 is a flow/block diagram illustrating one embodiment of read transaction in NoSQL databases, in accordance with one embodiment of the present disclosure.
Figure 10:
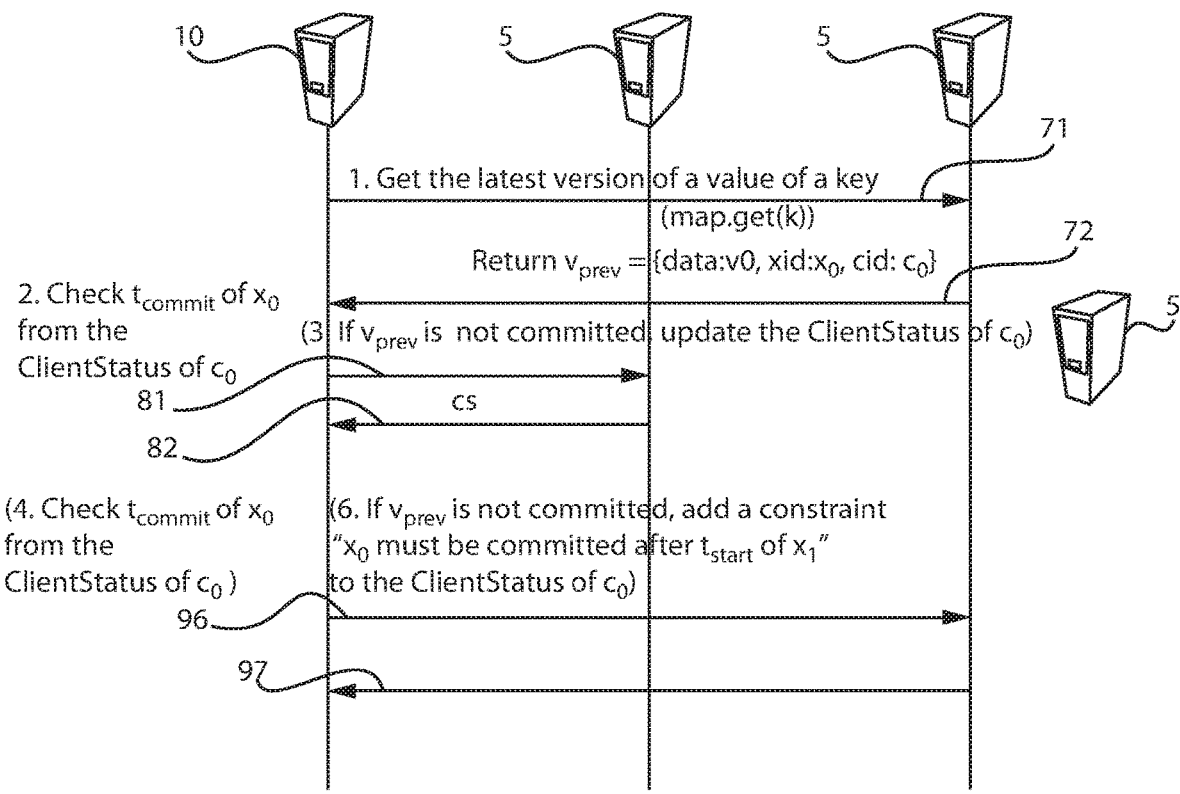
FIG. 10 is a schematic that illustrates one embodiment of a read transaction in NoSQL databases, in accordance with one embodiment of the present disclosure.

FIG. 9 illustrates one embodiment of a method of performing a read operation (xget) using NoSQL databases, in accordance with one embodiment of the present disclosure. FIG. 10 is a schematic that illustrates one embodiment of a read operation in a transaction $x_1$ in NoSQL databases. The read operation may be referred to as an xget operation, in which the client takes one read from a shard. In some embodiments, the xget operation may include fetching the latest version of value; confirming the version is committed via the status of the client that added the version; if it is not committed, trying to add an order constraint; and if the version is committed after the begin of the transaction, trying to read the previous version. One option in xget processing may include the client updating the cache of the client status of $v_{prev}$.cid by calling SYS.get($c_{id}$). The client can also add an order constraint to the client status of $v_{prev}$.cid before calling $v_{prev}$.prev( ).

Referring to step 65 of the method depicted in FIG. 9, the read operation may begin with fetching a latest version $v_{prev}$ of a value. The client may fetch the latest version $v_{prev}$ of a value by calling map.get(k). Referring to FIG. 10, the client 10 may fetch the value from a database server 5 of the NoSQL databases. This step is illustrated in FIG. 10 as step 1. More specifically, the client 10 sends a request, as identified by reference number 71, for the latest version of a value to the database server, e.g., NoSQL databases 5. Still at step 1, the database server 5, e.g., NoSQL databases, returns a version ($v_{prev}$) of the value to the client that made the request. This is illustrated by the arrow identified by reference number 71 in FIG. 10. The version ($v_{prev}$) of the value may include data, a transaction ID ($x_0$) and a client ID ($c_0$).

Referring to step 70 of FIG. 9, the method may continue with the client identifying the client ($c_{id}$) and transaction ($x_{id}$) from the version ($v_{prev}$) of the value. This is illustrated at step 2 in FIG. 10. In some embodiments, the client 10 can check the commit time ($t_{commit}$) of the version ($v_{prev}$) of the value from the client status (cs).

Referring to step 75 of FIG. 9, the method can continue with the client checking if the version of the value ($v_{prev}$.xid) has been committed.

At step 75 of FIG. 9, if the value is committed, the method continues to step 80. At step 80, the client identifies when $v_{prev}$.xid was committed by using the chanced client status of $v_{prev}$.cid.

At step 85 of the method depicted in FIG. 9, if the value is committed and the commit time ($t_{commit}$) is less than the start time ($t_{start}$), the client reads the data ($v_{prev}$.data) and there is a successful read event, e.g., step 90 includes return $v_{prev}$ data.

If the client cannot identify whether the version of the value ($v_{prev}$.xid) is committed with the cache of the client status, the client can update the cache of the client status of the value ($v_{prev}$.cid). For example, if the client ID, i.e., identified client, for the version ($x_0$) is not committed, the client updates the cache with the Client Status of the client ($c_0$). This is depicted as step 3 in FIG. 10 by the arrows identified by reference numbers 81, 82.

Turning to step 75 of FIG. 9, if the version ($v_{prev}$) of the value is not committed, the client waits for the finish of the transaction of $v_{prev}$.xid, or attempts to abort the transaction of $v_{prev}$.xid, or adds an order constraint to the client status of the client ($v_{prev}$.cid) in the NoSQL database. This step is illustrated in FIG. 10 by the arrows 96, 97. With the constraint in FIG. 10, the transaction of $x_0$ can be committed only when the $t_{commit}$ of $x_0$ is later than the $t_{start}$ of $x_0$.

Referring to step 95 of FIG. 9, if the client cannot read the version $v_{prev}$ of the value, the client gets the previous version, sets it to be the version $v_{prev}$ of the value, and then the process goes back to step 70.

Figure 12:
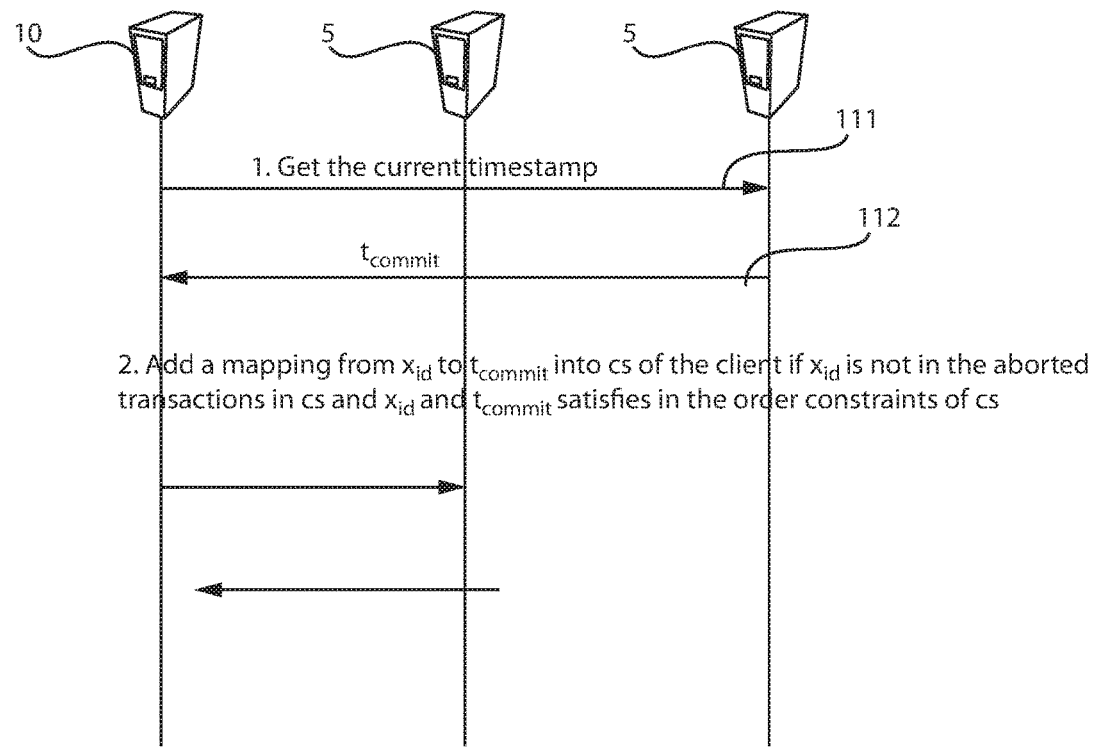
FIG. 12 is a schematic that illustrates one embodiment of a commit transaction in NoSQL databases, in accordance with one embodiment of the present disclosure.
Figure 11:
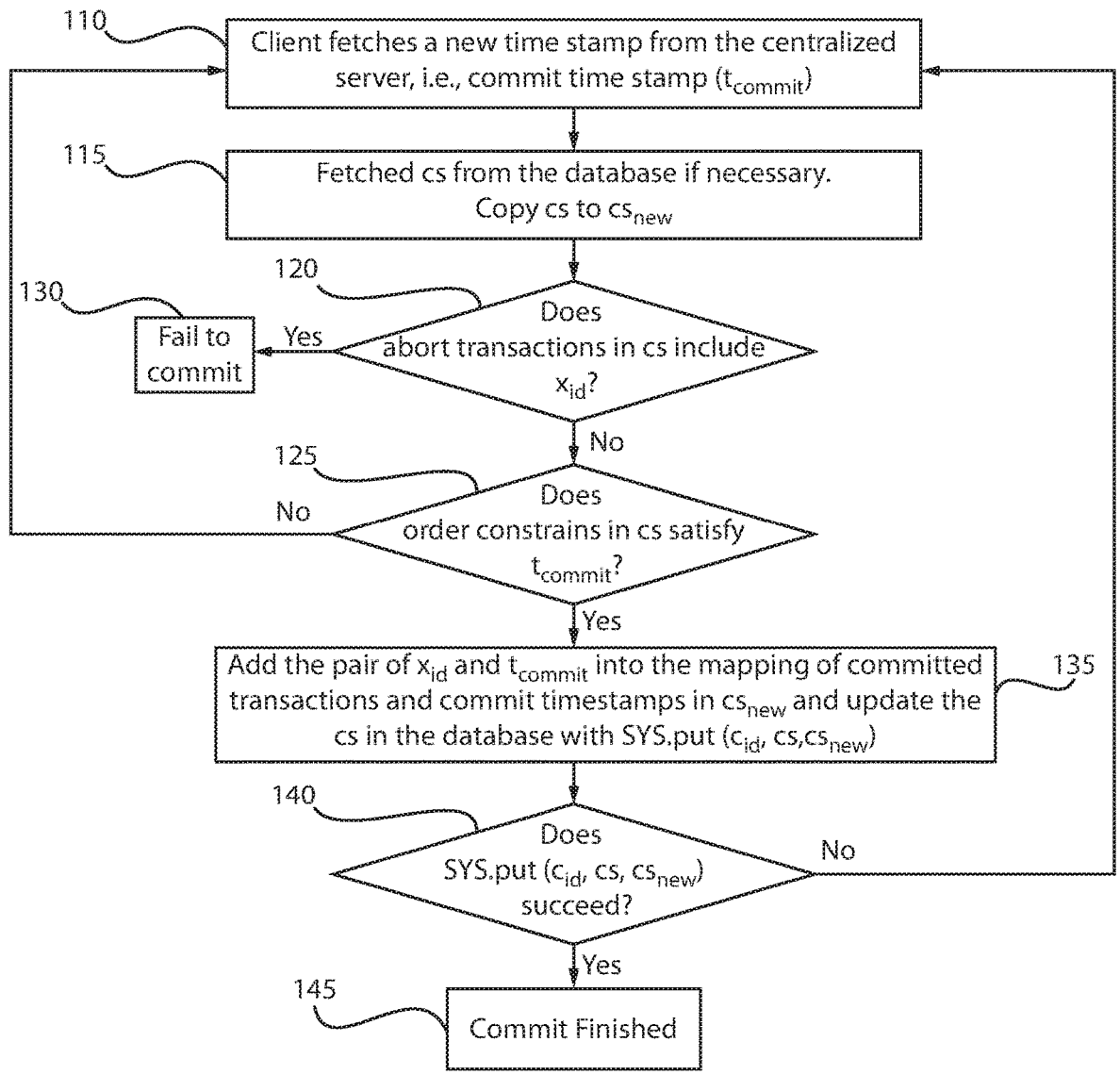
FIG. 11 is a flow/block diagram illustrating one embodiment of a commit transaction in NoSQL databases, in accordance with one embodiment of the present disclosure.

FIG. 11 illustrates one embodiment of a commit transaction in NoSQL databases. The commit transaction may include two calls to a centralized server (TS) and a shard of the client status, as depicted in FIG. 12 where $c_1$ commits a transaction of $x_1$.

Referring to FIG. 11, the commit transaction may begin with step 110, which may include getting a new timestamp ($t_{commit}$). As illustrated in FIG. 12, the client 10 may receive the new timestamp ($t_{commit}$) from the centralized server (TS). This is illustrated at step 1 in FIG. 12, which includes a request being made by the client as identified by reference number 111, and a new time stamp being sent to the client from the centralized service as identified by reference number 112.

At step 115, the commit transaction may continue with the fetched client status (cs) from the database when necessary. The fetched client status (cs) is copied to $cs_{new}$. The commit transaction updates the $cs_{new}$, as the next version of cs and will update cs in the database with $cs_{new}$ by calling at step 135.

At step 120, the commit transaction may continue with determined whether abort transactions in the client status (cs) include $x_{id}$. If the client status (cs) includes abort transactions, the transaction fails to commit at step 130. If the client status (cs) does not include abort transactions, a determination is made of whether order constraints in the client stats (cs) satisfy the commit time ($t_{commit}$). If the order constraints fail to satisfy the commit time, the sequence goes back to step 110 of FIG. 11. If the order constraints satisfy the commit time, the process continues to step 135.

Referring to FIG. 11, at step 135, the client adds the pair of the transaction ID ($x_{id}$) and the commit time ($t_{commit}$) into the mapping of committed transactions to commit timestamps in the client status $cs_{new}$. For example, the client updates the client status (cs) in the database with SYS.put ($c_{id}$, cs, $cs_{new}$). The client status $cs_{new}$ is also cached in the memory.

Still referring to FIG. 11, at step 140, the method continues with the client determining whether SYS.put($c_{id}$, cs, $cs_{new}$) succeeds. If SYS.put($c_{id}$, cs, $cs_{new}$) succeeds, the commit transaction is finished at step 15. If SYS.put($c_{id}$, cs, does not succeed, the process goes back to step 110. Further, if the clients status includes the transaction ID in the aborted transactions, the transaction fails at step 140, and the process goes back to step 110. Also, if the commit time ($t_{commit}$) does not satisfy the constraints in client status constraints at step 125, the method restarts again at step 110.

The above steps is depicted in FIG. 12 as step 2, in which the arrow identified by reference number 126 illustrates the client adding the transaction ID ($x_1$) to the client status of the client $c_1$. By using NoSQL database function, such as findAndModify method of MongoDB, the client can process steps of FIGS. 11 and 12 except for step 110 with only one interaction with the server.

One example of an order constraint for use with the method described above with reference to FIGS. 1-12 includes a scenario in which clients, i.e., client 1 (c1) and client 2 (c2) write and read a value, respectively. For example, the client 1 (c1) may start with a first transaction ID (Xid1) and with a first start time (Ts1). The first client (c1) updates the record with a new version (v); and the first client (c1) gets Tc2, a second commit time, as the commit timestamp. The client 2 (c2) starts with a second transaction (Xid2) with a second time stamp (Ts2) after Tc1. The client 2 (c2) skips reading v, i.e., the version of the value, because v is not committed. After the client 2 skipped reading v, the client 1 (c1) commits v with Tc1. Though Tc1<Ts2, the client 2 (c2) does not read v.

In the above scenario, one solution in accordance with the present disclosure is an order constraint. For example, before skipping reading v, the second client (c2) may add an order constraint of c1; Xid1 must be committed after Ts2. The client status may be implemented the constraint by adding a mapping from Xid1 to Ts2. This operation fails if the first transaction ID (Xid1) has been committed by using compare and swap function. The second client (c2) skips reading the version v of the value if the client can add the order constraint. The first client (c1) fails to commit v with Tc1 because order constraint is not satisfied and then the first client (c1) gets a new timestamp Tc1', which is later than Ts2. The first client (c1) may then commit the v of the value with Tc1'. It is noted that this is only one example of a constraint that may be used with the present disclosure, and it is not intended that the present disclosure be limited to only this example. Other examples of constraints have also been contemplated, and are within the scope of the present disclosure.

In some embodiments, the methods, systems and computer program products that are disclosed herein truncate and cache client statuses. Truncate committed transactions with presumed commit policy may provide that if a transaction state is not in the database, the transaction must be committed. In some embodiments, the methods, systems and computer program products may further include water marks (WM). A water mark (WM) may provide a transaction ID (Xid). Transactions with lower Xids than WM must be committed except for the listed aborted transactions. As described above, each client periodically stores and maintains watermarks (WM) in the NoSQL database.

In some embodiments, the methods, systems and computer program products disclosed herein provide for truncated aborted transactions with a timeout policy. In some embodiments, the time out policy includes that each transaction can not commit if the gap between the start and commit timestamps is greater than time out. In some embodiments, the time out policy includes the removal of all dirty versions of the aborted transactions from shards. In some examples, the latest timestamp following finishing of the removal of the dirty versions, the latest timestamp is a clean time stamp (cleanTS). In some embodiments, if clean TS is timed out, committable transactions can never see the aborted versions.

Figure 13:
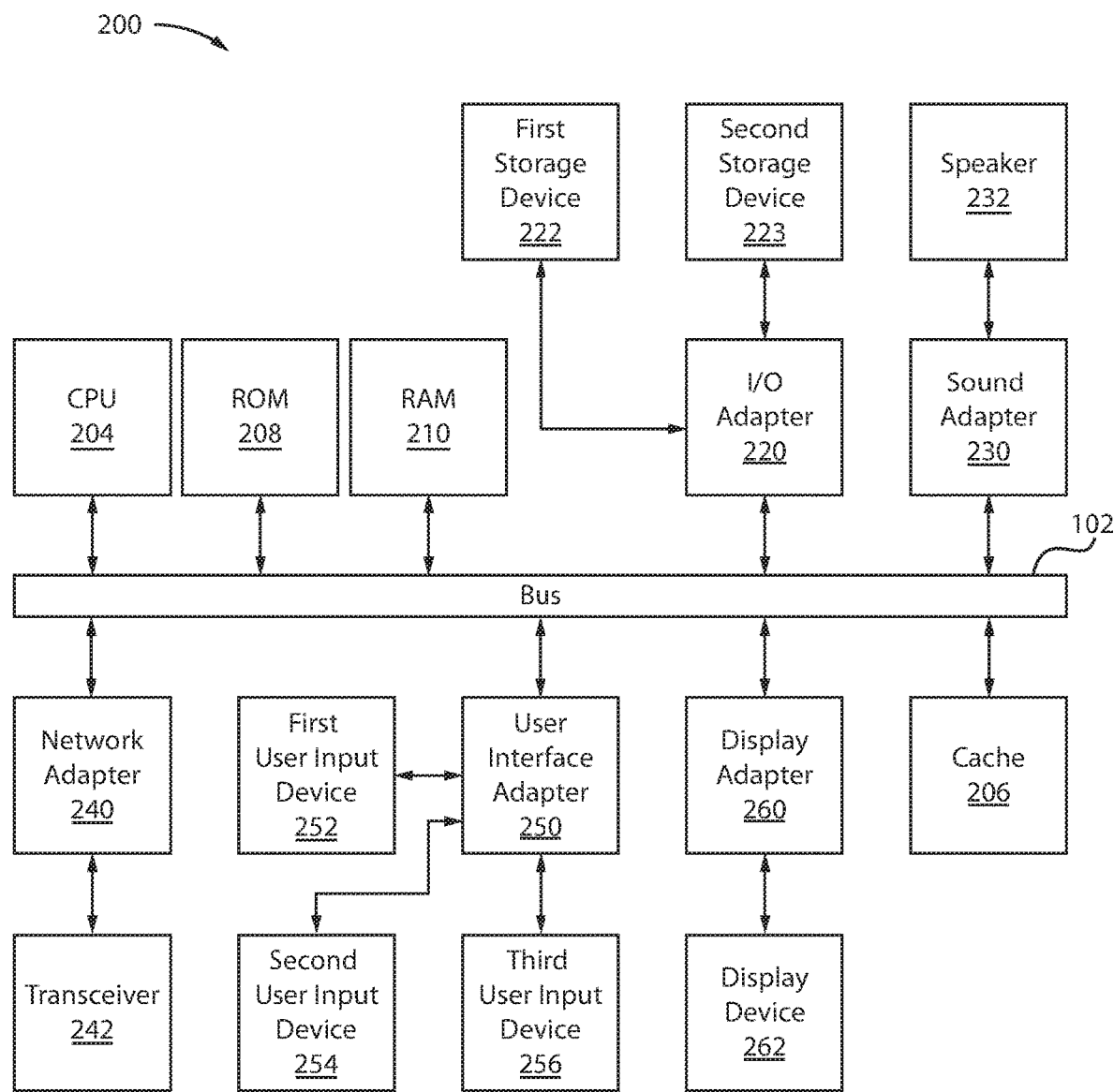
FIG. 13 shows an exemplary processing system to which the present principles may be applied, in accordance with an embodiment of the present principles.

FIG. 13 shows an exemplary processing system 200 to which the present principles may be applied as a client 10 interacting with the NoSQL database depicted in FIG. 3. The processing system 200 includes at least one processor (CPU) 204 operatively coupled to other components via a system bus 102. A cache 206, a Read Only Memory (ROM) 208, a Random Access Memory (RAM) 210, an input/output (I/O) adapter 220, a sound adapter 230, a network adapter 240, a user interface adapter 250, and a display adapter 260, are operatively coupled to the system bus 102.

A first storage device 222 and a second storage device 224 are operatively coupled to system bus 102 by the I/O adapter 220. The storage devices 222 and 224 can be any of a disk storage device (e.g., a magnetic or optical disk storage device), a solid state magnetic device, and so forth. The storage devices 222 and 224 can be the same type of storage device or different types of storage devices.

A speaker 232 is operatively coupled to system bus 102 by the sound adapter 230. A transceiver 242 is operatively coupled to system bus 102 by network adapter 240. A display device 262 is operatively coupled to system bus 102 by display adapter 260.

A first user input device 252, a second user input device 254, and a third user input device 256 are operatively coupled to system bus 102 by user interface adapter 250. The user input devices 252, 254, and 256 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 252, 254, and 256 can be the same type of user input device or different types of user input devices. The user input devices 252, 254, and 256 are used to input and output information to and from system 200.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present principles provided herein.

Figure 14:
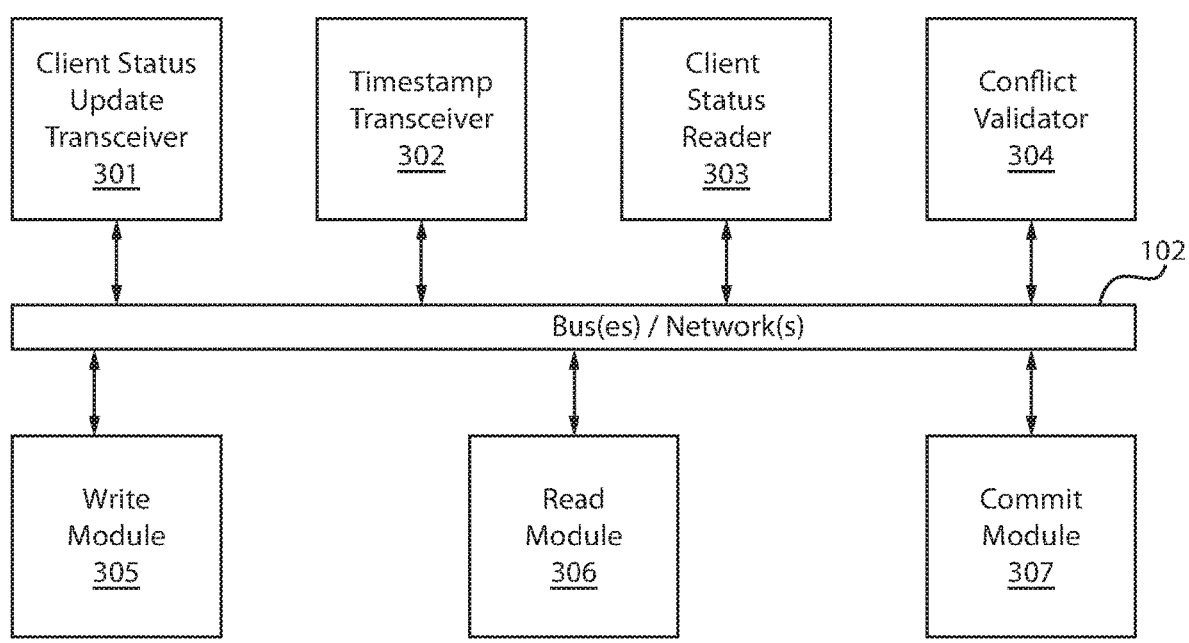
FIG. 14 is a block diagram illustrating an exemplary system for a processing transactions in NoSQL databases, in accordance with an embodiment of the present principles.

Moreover, it is to be appreciated that system 300 described below with respect to FIG. 14 is a system for implementing respective embodiments of the present principles. Part or all of processing system 200 may be implemented in one or more of the elements of system 300. Further, it is to be appreciated that processing system 200 may perform at least part of the method described herein including, for example, at least part of methods described with reference to FIGS. 1-12.

FIG. 14 shows an exemplary system 300 for a client supporting transactions in a NoSQL database, in accordance with an embodiment of the present principles. The system 300 includes at least a client status transceiver 301, a time stamp transceiver 302, a client status reader 303, a conflict validator 304, a read module 305, a write module 306 and a transaction module 306. In the embodiment shown in FIG. 14, the aforementioned elements thereof are interconnected by bus(es)/network(s) 102. However, in other embodiments, other types of connections can also be used. Moreover, in an embodiment, at least one of the elements of system 300 is processor-based, e.g., hardware processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 300 are readily determined by one of ordinary skill in the art, given the teachings of the present principles provided herein, while maintaining the spirit of the present principles.

In one embodiment, the client status update transceiver 301 provides for sending client status from a client to a NoSQL database. The time stamp receiver 302 provides for sending a call from said client to a client server in the NoSQL database, and receiving a time stamp from the client server. The functions provided by the client status update transceiver 301 and time stamp receiver 302 have been further described about with respect to the methods described with reference to FIGS. 1-12.

The system may further include a client status reader 303 for reading by the client of all clients' status from all clients sending client status to the NoSQL database, and a conflict validator 304 for validating no conflict for a read or write transaction by said client to said NoSQL database. The conflict validator 304 confirms that a latest version of a value is committed before a start time of the transaction. The functions provided by the client status reader 303 and conflict validator 304 have been further described about with respect to the methods described with reference to FIGS. 1-12.

The write module 305 provides for write transactions, and has been described in greater detail with respect to FIGS. 6, 7 and 8. The read module 306 provides for read transactions, and has been described in greater detail with respect to FIGS. 9 and 10. The commit module 307 provides for commit transactions, and has been described in greater detail with respect to FIGS. 11 and 12.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 14, a schematic of an example of a cloud computing node 1310 is shown. Cloud computing node 1310 is only one example of a suitable cloud computing node and is not intended to suggest any limitation as to the scope of use or functionality of embodiments of the invention described herein. Regardless, cloud computing node 1310 is capable of being implemented and/or performing any of the functionality set forth hereinabove.

In cloud computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1312 in cloud computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, memory 1328 may include at least one program product having a set (e.g., at least one) of program modules that are configured to carry out the functions of embodiments of the invention.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein. For example, the program modules 1342 can include the modules described with reference to FIG. 2.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples include, but are not limited to: microcode, device drivers, redundant processing units, external disk drive arrays, RAID systems, tape drives, and data archival storage systems, etc.

Figure 15:
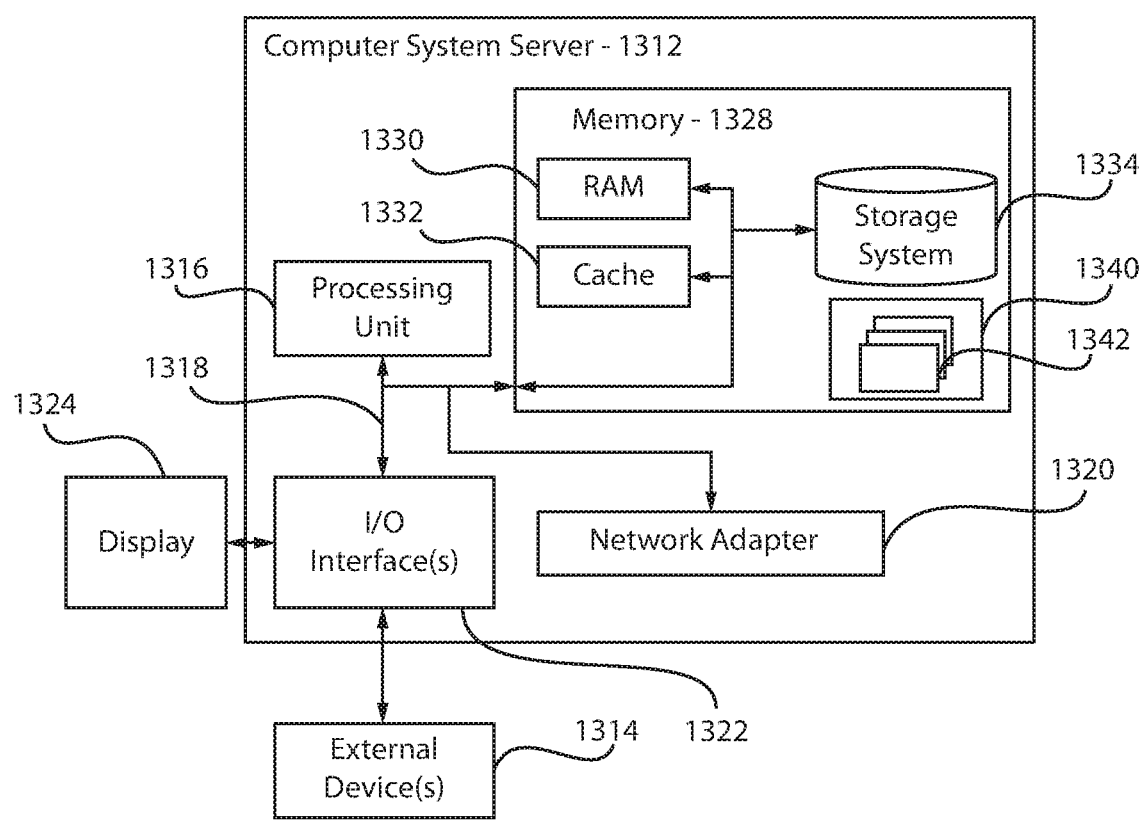
FIG. 15 shows an exemplary cloud computing node, in accordance with an embodiment of the present principles.
Figure 16:
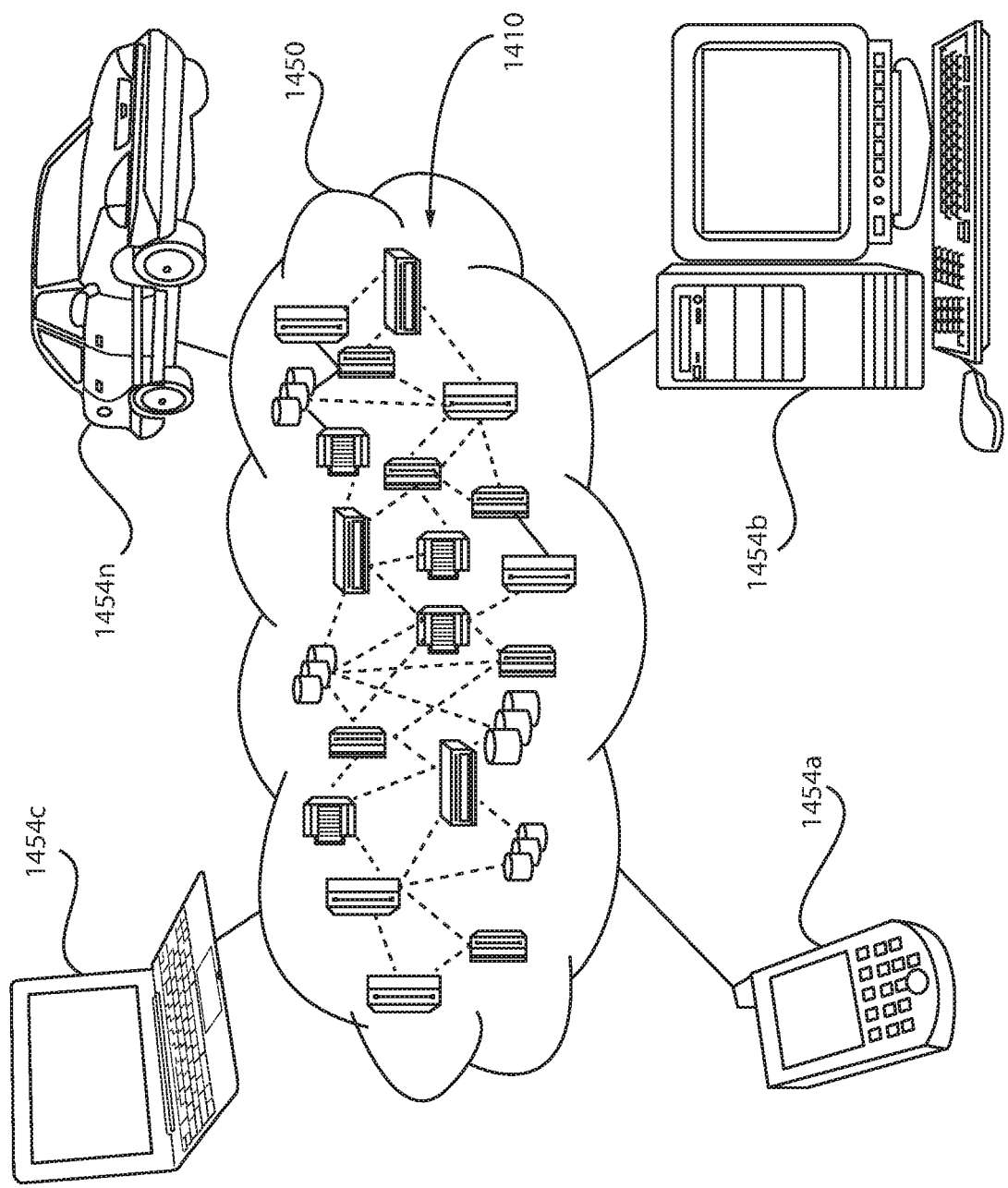
FIG. 16 shows an exemplary cloud computing environment, in accordance with an embodiment of the present principles.

Referring now to FIG. 15, illustrative cloud computing environment 1450 is depicted. As shown, cloud computing environment 1450 comprises one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 15 are intended to be illustrative only and that computing nodes 1410 and cloud computing environment 1450 can communicate with any type of computerized device over any type of network and/or network addressable connection (e.g., using a web browser).

Figure 17:
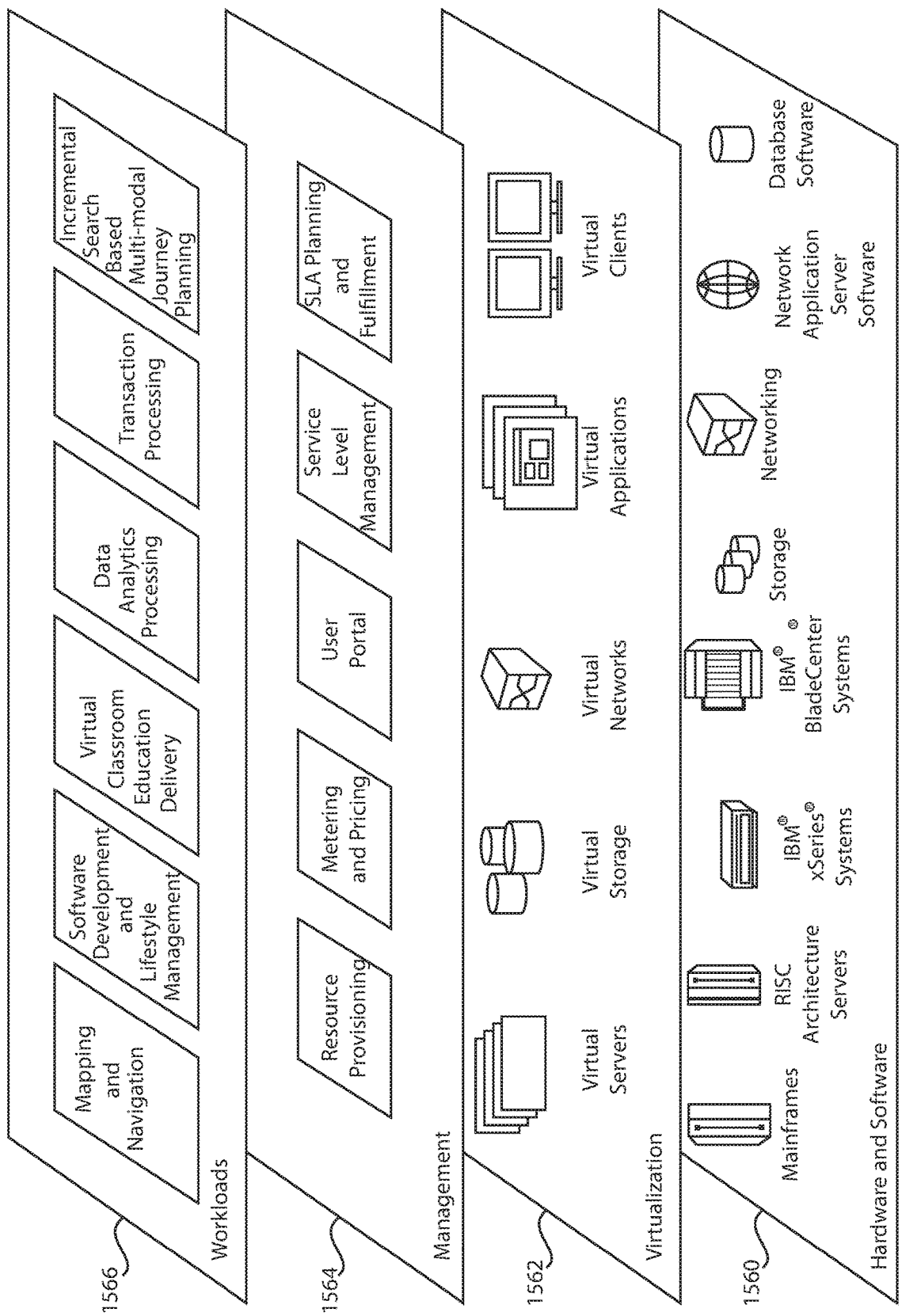
FIG. 17 shows exemplary abstraction model layers, in accordance with an embodiment of the present principles.

Referring now to FIG. 17 a set of functional abstraction layers provided by cloud computing environment 1550 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 1560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and providing for transactions in NoSQL databases.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of a client processing transactions in a NoSQL database comprising:
   inserting, by a plurality of clients, client statuses to said NoSQL database;
   sending a call, by a client of said plurality of clients, to a database server of said NoSQL database, wherein the database server sends a time stamp to said client as a start time of a current transaction;
   reading, by said client, said client statuses of said plurality of clients from the NoSQL database;
   fetching a latest version of a value from said NoSQL database, the value comprises a client ID, a transaction ID and data;
   checking a commit time of the latest version of the value from a client status of the client statuses based on the transaction ID mapped to the commit time, the commit time being greater than a constraint time, the constraint time indicating constraints to commit active transactions;
   validating, by said client, no conflict for said current transaction, by said client confirming that said latest version of said value is committed before said start time of the current transaction during the commit time of the latest version of the value;
   issuing an instruction by said client to said NoSQL database to abort committing said latest version of said value when a validation fails; and
   performing said current transaction by said client.

2. The method of claim 1, wherein the client status includes committed client status and aborted client status.

3. The method of claim 1, wherein said inserting client status from said plurality of clients to said NoSQL database comprises caching said client status in NoSQL database.

4. The method of claim 1, wherein said current transaction is a write transaction, and said validating said no conflict includes said client, identifying a cache of the client status with the values client ID, and checking a transaction ID for the latest version of the value to determine whether it has been committed.

5. The method of claim 4, wherein if the latest version of the value is not committed, a client status is updated at said cache and the validating said no conflict for the write transaction continues with said client fetching a second latest version of said value from said NoSQL database, identifying a cache of the updated client status with the values client ID, and checking a transaction ID for the second latest version of the value to determine whether it has been committed.

6. The method of claim 5, wherein if the second latest version is not committed, the client fails the write transaction, aborts the write transaction of the second latest version of the value, or orders a constraint to the client status.

7. The method of claim 6, wherein if the second latest version is not committed, the client reads a previous version of the value.

8. The method of claim 6, wherein a single write request is made for each transaction write.

9. The method of claim 1, wherein said current transaction is a read transaction, and said validating said no conflict includes said client checking if the transaction ID (VXid) for the latest version of said value is committed with the cached client status for the client ID (Cid), wherein if the transaction ID (VXid) is committed, and a commit time stamp from the client status is less than a start time stamp, data from the latest version of said value is read by the client.

10. The method of claim 1, wherein said current transaction is a read transaction, and said validating said no conflict includes said client checking if the transaction ID (VXid) for the latest version of said value is committed with the cached client status for the client ID (Cid), wherein if the transaction ID (VXid) is not committed, the client waits for the transaction of the transaction ID to complete, the client aborts the transaction of the latest version of said value or the client adds an order constraint to the client status in the NoSQL database.

11. The method of claim 1 further comprising a commit transaction.

12. A client system for controlling transactions with a NoSQL database comprising:
   a client status update transceiver for sending client status from a client to a NoSQL database;
   a time stamp transceiver for sending a call from said client to a database server of said NoSQL database, and receiving a time stamp from said database server representing a start time of a current transaction;
   a client status reader for reading by the client of all client statuses from all clients sending client status to the NoSQL database and checking a commit time of the latest version of the value from a client status of the client statuses based on a transaction ID mapped to the commit time, the commit time being greater than a constraint time, the constraint time indicating constraints to commit active transactions;
   a conflict validator for validating, by the client, no conflict for said current transaction, said conflict validator confirming that said latest version of said value is committed before said start time of the current transaction during the commit time of the latest version of the value, wherein the value comprises a client ID, the transaction ID and data, said conflict validator issuing an instruction by said client to said NoSQL database to abort committing said latest version of said value when a validation fails; and
   a transaction module for performing said transaction by said client if said latest version of the value has been committed.

13. The system of claim 12, wherein said current transaction is a write transaction, and said validating said no conflict includes said client identifying a cache of the client status with the values client ID, and checking a transaction ID for the latest version of the value to determine whether it has been committed.

14. The system of claim 13, wherein if the latest version of the value is not committed, a client status is updated at said cache and the validating said no conflict for the write transaction continues with said client fetching a second latest version of said value from said NoSQL database, identifying a cache of the updated client status with the values client ID, and checking a transaction ID for the second latest version of the value to determine whether it has been committed.

15. The method of claim 14, wherein if the second latest version is not committed, the client fails the write transaction, aborts the write transaction of the second latest version of the value, or orders a constraint to the status.

16. The system of claim 15, wherein if the second latest version is not committed, the client reads a previous version of the value.

17. The system of claim 12, wherein said current transaction is a read transaction, and said validating said no conflict includes said client checking if the transaction ID (VXid) for the latest version of said value is committed with the cached client status for the client ID (Cid), wherein if the transaction ID (VXid) is committed, and a commit time stamp from the client status is less than a start time stamp, data from the latest version of said value is read by the client.

18. The system of claim 17, wherein said current transaction is a read transaction, and said validating said no conflict includes said client checking if the transaction ID (VXid) for the latest version of said value is committed with the cached client status for the client ID (Cid), wherein if the transaction ID (VXid) is not committed, the client waits for the transaction of the transaction ID to complete, the client aborts the transaction of the latest version of said value or the client adds an order constraint to the client status in the NoSQL database.

19. The system of claim 12 further comprising a commit transaction module.

20. A non-transitory computer readable storage medium comprising a computer readable program for a client processing transactions in a NoSQL database, wherein the computer readable program when executed on a computer causes the computer to perform the steps of:
   inserting, by a plurality of clients, client statuses to said NoSQL database;
   sending a call, by a client of said plurality of clients, to a database server of said NoSQL database, wherein the database server sends a time stamp to said client as a start time of a current transaction;
   reading, by said client, said client statuses of said plurality of clients from the NoSQL database;
   fetching a latest version of a value from said NoSQL database, the value comprises a client ID, a transaction ID and data;
   checking a commit time of the latest version of the value from a client status of the client statuses based on a transaction ID mapped to the commit time, the commit time being greater than a constraint time, the constraint time indicating constraints to commit active transactions;
   validating, by said client, no conflict for said current transaction, by said client confirming that said latest version of said value is committed before said start time of the current transaction during the commit time of the latest version of the value;
   issuing an instruction by said client to said NoSQL database to abort committing said latest version of said value when a validation fails; and
   performing said current transaction by said client.

* * * * *